(12) United States Patent
Dasari et al.

(10) Patent No.: US 8,458,699 B2
(45) Date of Patent: Jun. 4, 2013

(54) METHODS, SYSTEMS, AND APPARATUS TO PRIORITIZE COMPUTING DEVICES FOR VIRTUALIZATION

(75) Inventors: Rajashekar Dasari, Hyderabad Andhra Pradesh (IN); Hari Dhanalakoti, Hyderabad A P (IN); Raju Kalidindi, Hyderabad Andhra Pradesh (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 310 days.

(21) Appl. No.: 12/949,476

(22) Filed: Nov. 18, 2010

(65) Prior Publication Data

US 2012/0131573 A1 May 24, 2012

(51) Int. Cl.
*G06F 9/455* (2006.01)
*G06F 9/46* (2006.01)

(52) U.S. Cl.
USPC ................................. 718/1; 718/104

(58) Field of Classification Search
None
See application file for complete search history.

(56) References Cited

U.S. PATENT DOCUMENTS

| | | | |
|---|---|---|---|
| 7,080,221 B1 * | 7/2006 | Todd et al. | 711/161 |
| 7,831,788 B1 * | 11/2010 | Ohr et al. | 711/162 |
| 2005/0120160 A1 | 6/2005 | Plouffe et al. | |
| 2005/0149540 A1 * | 7/2005 | Chan et al. | 707/100 |
| 2006/0041668 A1 * | 2/2006 | Dinger et al. | 709/229 |
| 2007/0106682 A1 | 5/2007 | Frank | |
| 2008/0162800 A1 | 7/2008 | Takashige et al. | |
| 2008/0163234 A1 | 7/2008 | Stronge et al. | |

OTHER PUBLICATIONS

EMC Corp.,"EMC Ionix Physical to Virtual to Cloud Next-Generation IT Management", emc.com/collateral/emc-perspective/h6463-ionix-physic-virt-ep.pdf, Hopkinton, MA.

* cited by examiner

*Primary Examiner* — Camquy Truong (57) ABSTRACT

In one embodiment, a virtualization analysis tool defines a classification weight value for each physical computing device from a plurality of physical computing devices, defines an effective utilization value for that physical computing device, and associates a virtual migration priority with that physical computing device based on the effective utilization value. The virtualization analysis tool defines the effective utilization value based on the classification weight value, a first utilization weight value, and a second utilization weight value. The first utilization weight value is associated with a first resource of that physical computing device, and the second utilization weight value associated with a second resource of that physical computing device. The virtual migration priority has a first value if the effective utilization value is within a first range of utilization weight values and a second value if the effective utilization value is within a second range of utilization weight values.

14 Claims, 7 Drawing Sheets

METHODS, SYSTEMS, AND APPARATUS TO PRIORITIZE COMPUTING DEVICES FOR VIRTUALIZATION

BACKGROUND

Information technology ("IT") departments and data centers attempting to consolidate servers by using virtualization technologies face challenges such as which servers should be migrated to a virtualized environment (i.e., virtualized). Virtualization is a technology that can be leveraged to achieve benefits such as reduced IT infrastructure costs and increased quality and agility of IT infrastructure. Virtualization enables execution of multiple operating systems concurrently on a single physical server, where each of the operating systems runs as a self-contained computing device or virtual machine. Hypervisors carry out time- and cost-saving tasks through virtual machines in virtualized environments with advanced levels of scalability, manageability and reliability.

Typically, not all computing devices within, for example, a data center are migrated to virtualized environments (or virtualized). Rather, system administrators observe or monitor the utilization level of computing devices (e.g., servers) and determine which computing devices should be virtualized. Manually identifying the computing devices that are candidates for virtualization (i.e., which computing devices can benefit from virtualization) from hundreds or thousands of computing devices can be a tedious, inefficient, and time-consuming task.

This task can be simplified by tools that allow system administrators to view present or current utilization values of many computing devices within, for example, a data center. However, such known tools fail to provide systems administrators with information related to the utilization of computing devices during various past time periods. In other words, the system administrators using such known tools have limited visibility into the history of the utilization of the computing devices. Thus, system administrators typically determine which computing devices are candidates for virtualization by observing utilization values provided by such known tools and manually accessing historic utilization information.

DETAILED DESCRIPTION

Embodiments discussed herein identify computing devices (e.g., computer servers) that can benefit from virtualization. In other words, embodiments discussed herein identify computing devices that should be replaced by virtual machines based on parameters (or criteria) defined by a system administrator. A computing device can be virtualized by executing the software applications stored at a memory and executed at a processor of another computing device within a virtualized environment. For example, embodiments discussed herein can identify over-utilized and/or under-utilized computing devices based on resource (e.g., memory, processor, and/or storage) utilization at those computing devices and provide a report that prioritizes the computing devices (i.e., assigns virtual migration priorities to the computing devices) that can benefit from migration to a virtualized environment. Thus, a system administrator need not manually observe and/or record utilization information related to computing devices to determine whether those computing devices can benefit from virtualization.

As an example, a virtualization analysis tool can include various modules (i.e., hardware module or software modules including instructions or code that are stored at a memory and executed at a processor) to determine virtual migration priorities of computing devices based on parameters provided to the virtualization analysis tool by a system administrator. The virtualization analysis tool can access utilization values related to the use of resources at computing devices such as historic or past utilization values stored at a database and assign virtual migration priorities to those computing devices (or prioritize those computing devices for virtualization) based on the utilization values and the parameters provided by the system administrator. Thus, the prioritization or analysis of the computing devices is quantifiable because the computing devices are assigned virtual migration priorities indicating an extent to which each computing device can benefit from virtualization. In some embodiments, the virtual migration priorities are relative. That is, the priorities indicate to what extent or degree a particular computing device can benefit from virtualization in comparison or relation to the other computing devices. In other embodiments, the virtual migration priorities are absolute. That is, the priorities indicate to what extent or degree a particular computing device can benefit from virtualization in comparison or relation to a defined scale or standard rather that in comparison to the other computing devices.

Additionally, the virtualization analysis tool can present to the system administrator recommendations of which computing devices should be virtualized based on virtual migration priorities of those computing devices. In other words, the virtualization analysis tool can suggest which computing devices are candidates for virtualization. Thus, the system administrator can provide parameters to the virtualization analysis tool and receive recommendations of which computing devices are candidates for virtualization based on those parameters without manual observation of those computing devices.

As used in this specification, the singular forms "a," "an," and "the" include plural referents unless the context clearly dictates otherwise. Thus, for example, the term "virtualization analysis tool" is intended to mean one or more virtualization analysis tools or a combination of virtualization analysis tools. Additionally, as used herein, the term "module" refers to circuitry and/or software, firmware, programming, machine- or processor-readable instructions, commands, or code that are stored at a memory and executed or interpreted at a processor.

Figure 1:
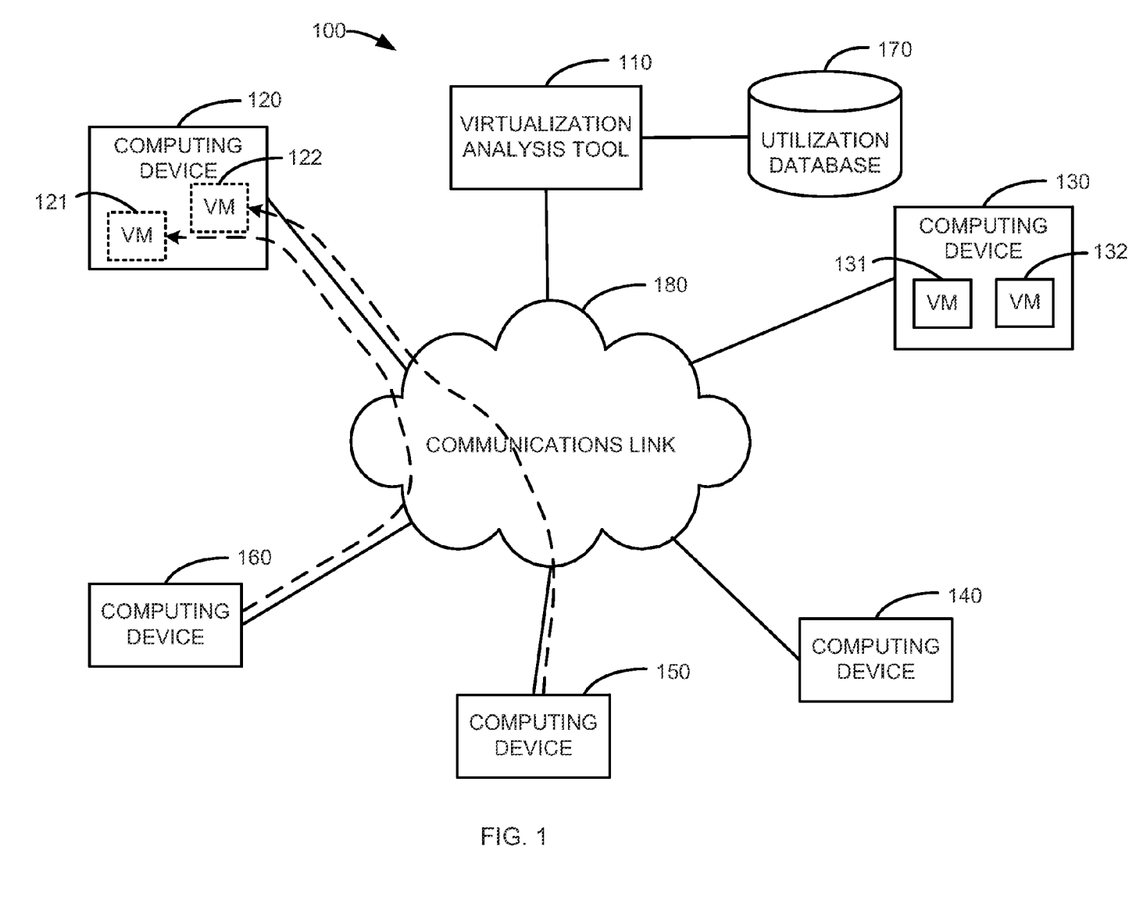
FIG. 1 is a schematic block diagram of an environment including a virtualization analysis tool, according to an embodiment.

FIG. 1 is a schematic block diagram of an environment including a virtualization analysis tool, according to an embodiment. Environment 100 includes virtualization analysis tool 110, computing device 120, computing device 130, computing device 140, computing device 150, computing device 160, utilization database 170, and communications link 180. Computing devices 120, 130, 140, 150, and 160 are computing devices such as computer servers (or servers) that are operatively coupled via communications link 180. Computing devices 120 and 130 are configured to host virtual machines. In other words, computing devices 120 and 130 include a virtualization hardware module, a virtualization software module such as a hypervisor stored at a memory and hosted at a processor, and/or a combination of a virtualization hardware module and a virtualization software module. As illustrated in FIG. 1, computing device 130 hosts virtual machines 131 and 132. Virtual machines 131 and 132 function similar to computing devices 140, 150, and 160. In other words, virtual machines 131 and 132 can, for example, host an operating system and/or software modules (e.g., software application programs) and can communicate with other computing devices and/or virtual machines via communications link 180. However, virtual machines 131 and 132 are hosted within a virtualized environment at computing device 130. Virtual machines can be, therefore, referred to as virtual computing devices. That is, virtual machines 131 and 132 are virtualized computing devices. Similarly, computing devices 120, 130, 140, 150, and 160 can be referred to as physical computing devices to distinguish computing devices that are not virtual (or within a virtualized environment) from computing devices that are virtual.

Figure 2:
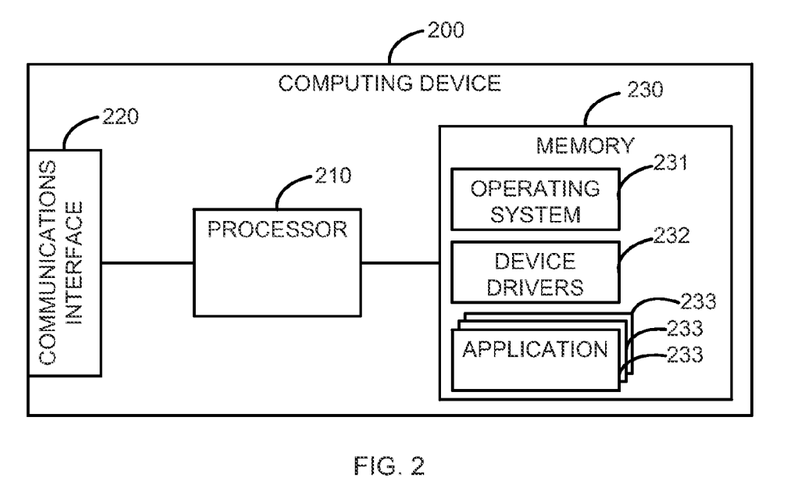
FIG. 2 is a schematic block diagram of a computing device, according to an embodiment.

As an example of a computing device, FIG. 2 is a schematic block diagram of a computing device, according to an embodiment. As illustrated in FIG. 2, computing device 200 includes communications interface 220, processor 210, and memory 230. Processor 210 is operatively coupled to communications interface 220 and memory 230. Typically, as illustrated in FIG. 2, memory 230 includes instructions or codes (e.g., computer codes or object codes) defining software modules that are executed by processor 210 during operation of computing device 210. For example, memory 230 includes instructions that define operating system 231, device drivers 232, and applications 233 (e.g., software application programs). In other words, operating system 231, device drivers 232, applications 233, and other software modules stored as instructions (not shown) at memory 230 and executed at processor 210 are hosted at computing device 200. Applications 233 can include, for example, an application module, a hypervisor, and/or an environment such as a runtime environment and/or virtual machine.

Memory 230 can include volatile memory such as static random access memory ("SRAM") and/or dynamic random access memory ("DRAM") and nonvolatile memory such as magnetic media (e.g., a hard disk drive), optical media (e.g., a compact disc ("CD") and/or a digital video disc ("DVD")), solid-state media (e.g., a USB FLASH memory device), and/or other processor-readable media. For example, nonvolatile memory can be used as long-term storage for operating system 231, device drivers 232, applications 233, data files (not shown), and/or other software modules stored as instructions (not shown), and operating system 231, device drivers 232, applications 233, data files (not shown), and/or other software modules stored as instructions (not shown) can be loaded into volatile memory for execution at processor 210.

Communications interface 220 is an interface accessible to processor 210 to communicate with (i.e., transmit symbols representing data to and receive such symbols from) other processors and/or computing devices via a communications link. In other words, communications interface 220 can receive data from processor 210 and transmit symbols representing that data via a communications link. Moreover, communications interface 220 can receive symbols from other communications interfaces via a communications link and send data represented by those symbols to processor 210. For example, communications interface 220 can be a telephone network interface, a twisted-pair network interface, a coaxial network interface, a fiber-optic network interface, a wireless network interface such as a wireless local area network ("WLAN") or a cellular network, and/or some other network or communications interface.

Referring to FIG. 1, communications link 180 can include any connector and/or system that allow virtualization tool 110 and computing devices 120, 130, 140, 150, and/or 160 to communicate one with another and/or with other computing devices. For example, communications link 180 can be one or more of a cable (e.g., telecommunication cable, twisted-pair cable, coaxial cable, or fiber-optic cable), wireless link or connection (e.g., radio-frequency link, wireless optical link, infrared link, or sonic link), or any other connector or system that supports transmission of communications symbols. Additionally, communications link 180 can include a communications network or combination of communications networks capable of transmitting information (e.g., symbols or signals representing data) such as, for example, an Ethernet network, a fiber-optic network, a switch fabric, a wireless network, an intranet, and/or the Internet.

In some embodiments, communications link 180 can include multiple communications links and/or communications networks operatively coupled one to another by, for example, bridges, routers, switches, hubs, and/or gateways. For example, virtual machine 131 can be operatively coupled to a cellular network (not shown) via computing device 130 and computing device 160 can be operatively coupled to a fiber-optic network (not shown). The cellular network and fiber-optic network can each be operatively coupled one to another via one or more network bridges, routers, switches, and/or gateways such that the cellular network and the fiber-optic network are operatively coupled to form a communications link. Alternatively, the cellular network and fiber-optic network can each be operatively coupled one to another via one or more additional communications networks. For example, the cellular network and the fiber-optic network can each be operatively coupled to the Internet such that the cellular network, the fiber-optic network and the Internet are operatively coupled to form a communications link.

Virtualization analysis tool 110 is a hardware module, a software module stored at a memory and hosted at a processor, and/or a combination of a hardware module and a software module that identifies computing devices that are candidates for virtualization. In some embodiments, virtualization analysis tool 110 is a plug-in or extension such as a dynamically loadable library of a system monitoring (or management) tool. Virtualization analysis tool 110 accesses utilization values that are related to utilization of computing devices within environment 100. For example, virtualization analysis tool 110 can access utilization values that are stored periodically (e.g., hourly, daily, weekly, monthly, etc.) at utilization database 170.

As a specific example, a system monitoring tool including virtualization analysis tool 110 can periodically poll utilization values (e.g., memory utilization values, data storage utilization values, and processor utilization values) at computing devices 140, 150, and 160 via communications link 180 and store those utilization values at utilization database 170. In other words, the system monitoring tool can communicate with an operating system or agent at each of computing devices 140, 150, and 160 to access utilization values and store those utilization values at utilization database 170. Virtualization analysis tool 110 can access those utilization values at utilization database 170 and determine which computing devices of computing devices 140, 150, and 160 are candidates for virtualization. Alternatively, virtualization analysis tool 110 can periodically poll utilization values (e.g., memory utilization values, data storage utilization values, and processor utilization values) at computing devices 140, 150, and 160 via communications link 180 and store those utilization values at utilization database 170 independent of a system monitoring tool.

As illustrated in FIG. 1, virtualization analysis tool 110 can identify computing devices 150 and 160 as candidates for virtualization and determine that computing device 140 is not presently a candidate for virtualization. That is, virtualization analysis tool 110 can determine based on utilization values from, for example, utilization database 170 and parameters provided by, for example, a system administrator that computing devices 150 and 160 are over- or under-utilized relative to the capabilities of computing devices 150 and 160 and can recommend that computing devices 150 and 160 be virtualized as virtual machines 122 and 121, respectively, at computing device 120.

Figure 3:
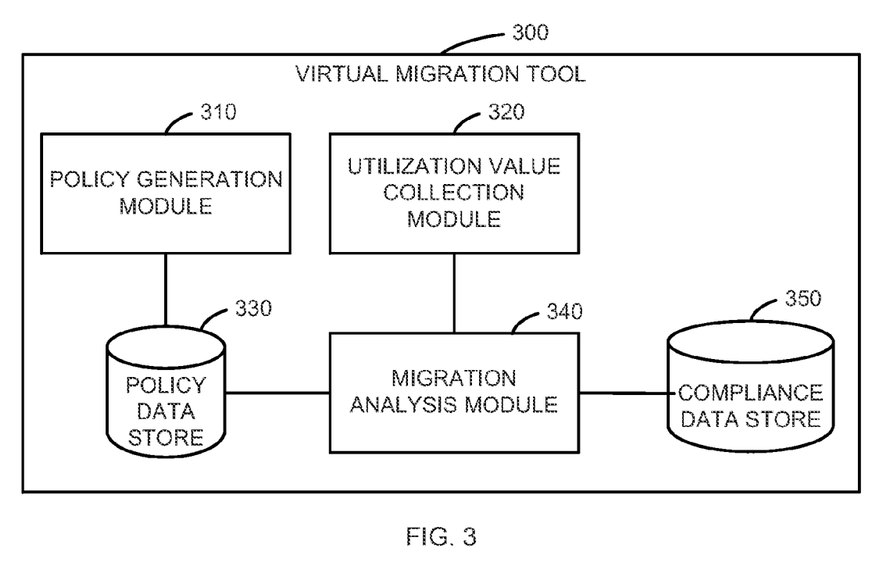
FIG. 3 is a schematic block diagram of a virtualization analysis tool, according to an embodiment.

FIG. 3 is a schematic block diagram of a virtualization analysis tool, according to an embodiment. Virtualization analysis tool 300 includes policy generation module 310, policy data store 330, utilization value collection module 320, migration analysis module 340, and compliance data store 350. Policy generation module 310 is a hardware module, a software module stored at a memory and hosted at a processor, and/or a combination of a hardware module and a software module that defines virtual migration policies based on parameters (e.g., threshold values, ranges of values, classification values, weight or weighting values, etc.) provided by a user such as a system administrator.

For example, a virtual migration policy can include ranges of values related to resources of a computing device and computing device classifications associated with those ranges. For example, a virtual migration policy can include three ranges of values related to a memory resource of a computing device, three ranges of values related to a processor resource of a computing device, and three ranges of values related to a data storage resource of a computing device. Each of the three ranges of values for each resource type or class (i.e., memory resource, processor resource, and data storage resource) can be associated with a computing device classification. More specifically, the lowest range of values for each resource can be associated with a computing device classification of low, the middle range of values for each resource can be associated with a computing device classification of medium, and the highest range of values for each resource can be associated with a computing device classification of high.

Additionally, a virtual migration policy can include utilization weight values. For example, a policy can include utilization weight values related to each resource class and for each computing device classification. As a specific example, a virtual migration policy can include three utilization weight values for a memory resource. One of the utilization weight values is related to a computing device classification of high, another of the utilization weight values is related to a computing device classification of medium, and yet another of the utilization weight values is related to a computing device classification of low.

A virtual migration policy can also include ranges of utilization values to determine which utilization weight value for a given resource class should be applied to a computing device with a particular utilization value. For example, one utilization weight value can be applied to one computing device that has a utilization value of 85% for a memory resource, and a different utilization weight value can be applied to a different computing device that has a utilization value of 36% for a memory resource. In other words, a virtual migration policy can include ranges of utilization values that define which utilization weight values are applied to computing devices with utilization values for resources that are included within those ranges of utilization values.

Moreover, a virtual migration policy can also include ranges of utilization weight values that are associated with virtual migration priorities. That is, ranges of utilization weight values can be used to define the virtual migration priority of a computing device by determining within which of the ranges of utilization weight values the utilization weight values applied to that computing device are included. The virtual migration priority associated with the range of utilization weight values in which the utilization weight values applied to a particular computing device are included is assigned to that computing device.

Figure 4:
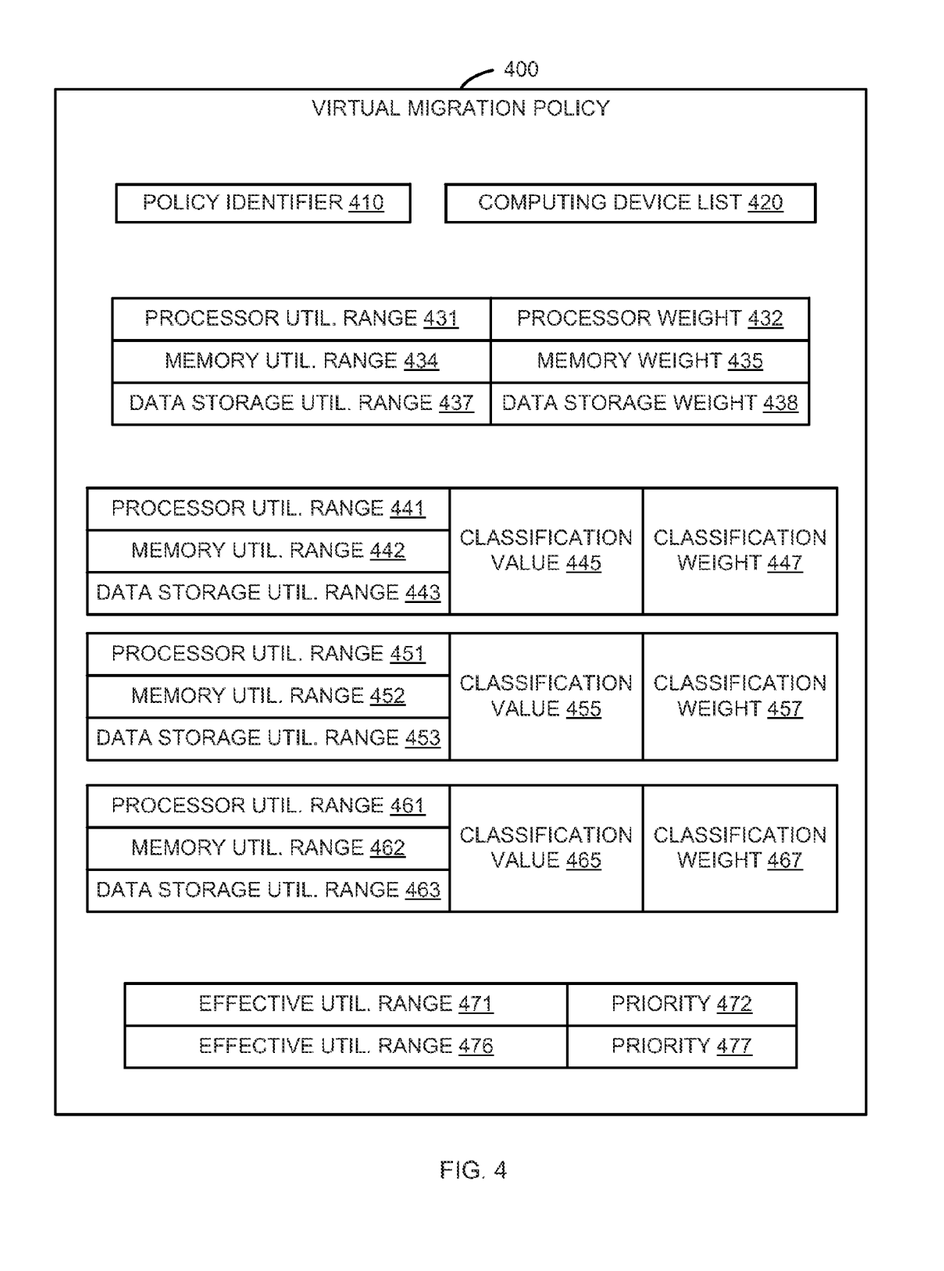
FIG. 4 is an illustration of a virtual migration policy, according to an embodiment.

As a specific example, FIG. 4 is an illustration of a virtual migration policy, according to an embodiment. Virtual migration policy 400 includes policy identifier 410, computing device list 420, and parameters related to identification of computing devices that are candidates for virtualization. Policy identifier 410 is a name, numeric identifier, or other value that identifies virtual migration policy 400, for example, from a group of virtual migration policies stored at a policy data store. Computing device list 420 identifies a group of computing devices that will be considered or analyzed to determine whether any computing devices from the group of computing devices are candidates for virtualization. In other words, computing device list 420 defines a group of computing devices to which virtual migration policy 400 applies. As a specific example, computing device list 420 can include a group of IP addresses or host names of computing devices. As another example, computing device list 420 can include threshold IP addresses that define a range of IP addresses associated with computing devices that will be analyzed. More specifically, computing device list 420 can include an IP address of 10.0.1.100 and an IP address of 10.0.1.200. Any computing device with an IP address greater than 10.0.1.100 and less than 10.0.1.200 will be considered or analyzed (as discussed in more detail herein) to determine if that computing device is a candidate for virtualization (i.e., to prioritize that computing device).

Processor utilization range 431 (labeled PROCESSOR UTIL. RANGE), memory utilization range 434 (labeled MEMORY UTIL. RANGE), data storage utilization range 437 (labeled DATA STORAGE UTIL. RANGE), processor weight 432, memory weight 435, and data storage weight 438 are parameters (or utilization parameters) used to determine a virtual migration priority for a computing device. More specifically, processor utilization range 431 defines a range of utilization values related to utilization of a processor, memory utilization range 434 defines a range of utilization values related to utilization of a memory, and data storage utilization range 437 defines a range of utilization values related to utilization of data storage. For example, processor utilization range 431 can include a list of utilization values, threshold utilization values (i.e., extrema values such as a low extreme utilization value and a high extreme utilization value), and/or other utilization values that define a range of utilization values. Similarly, memory utilization range 434 and data storage utilization range 437 can include a list of utilization values, threshold utilization values (i.e., extrema values such as a low extreme utilization value and a high extreme utilization value), and/or other utilization values that define a range of utilization values. If a processor utilization value of a computing device is included within processor utilization range 431, processor weight (or processor weight value) 432 can be associated with that computing device; if a memory utilization value of a computing device is included within memory utilization range 434, memory weight (or memory weight value) 435 can be associated with that computing device; and if a data storage utilization value of a computing device is included within data storage utilization range 437, data storage weight (or data storage weight value) 438 can be associated with that computing device.

Processor utilization range 441 (labeled PROCESSOR UTIL. RANGE), memory utilization range 442 (labeled MEMORY UTIL. RANGE), data storage utilization range 443 (labeled DATA STORAGE UTIL. RANGE), classification value 445, and classification weight (or classification weight value) 447 are other parameters (or utilization parameters) used to determine a virtual migration priority for a computing device. Similarly, utilization range 451 (labeled PROCESSOR UTIL. RANGE), memory utilization range 452 (labeled MEMORY UTIL. RANGE), data storage utilization range 453 (labeled DATA STORAGE UTIL. RANGE), classification value 455, and classification weight (or classification weight value) 457 are parameters (or utilization parameters) used to determine a virtual migration priority for a computing device, as are utilization range 461 (labeled PROCESSOR UTIL. RANGE), memory utilization range 462 (labeled MEMORY UTIL. RANGE), data storage utilization range 463 (labeled DATA STORAGE UTIL. RANGE), classification value 465, and classification weight (or classification weight value) 467. More specifically, these parameters can be used to determine a classification of a computing device and associate a classification weight with that computing device.

For example, after utilization values from a computing device are accessed at a virtualization analysis tool, the corresponding values can be compared with processor utilization range 441, memory utilization range 442, and data store utilization range 443. If the corresponding utilization values (i.e., processor utilization value, memory utilization value, and data storage utilization value, respectively) of the computing device are included within the ranges defined by processor utilization range 441, memory utilization range 442, and data store utilization range 443, classification value 445 and classification weight 447 can be associated with that computing device. In other words, if utilization values of a computing device satisfy processor utilization range 441, memory utilization range 442, and data store utilization range 443, that computing device can be assigned classification value 445. In some embodiments, classification value 445 and classification weight 447 can be assigned to (or associated with) a computing device if utilization values of that computing device satisfy one or more of processor utilization range 441, memory utilization range 442, and data store utilization range 443.

Similarly, if the corresponding utilization values (i.e., processor utilization value, memory utilization value, and data storage utilization value, respectively) of a computing device are included within the ranges defined by processor utilization range 451, memory utilization range 452, and data store utilization range 453, classification value 455 and classification weight 457 can be associated with that computing device. Moreover, if the corresponding utilization values (i.e., processor utilization value, memory utilization value, and data storage utilization value, respectively) of a computing device are included within the ranges defined by processor utilization range 461, memory utilization range 462, and data store utilization range 463, classification value 465 and classification weight 467 can be associated with that computing device. In some embodiments, classification value 445 and classification weight 447 are assigned to a computing device if utilization values from that computing device satisfy more of processor utilization range 441, memory utilization range 442, and data storage utilization range 443 than those utilization values satisfy of processor utilization range 451, memory utilization range 452, and data storage utilization range 453 and than those utilization values satisfy of processor utilization range 461, memory utilization range 462, and data storage utilization range 463.

Effective utilization range (or effective utilization value range) 471 (labeled EFFECTIVE UTIL. RANGE) and effective utilization range (or effective utilization value range) 476 (labeled EFFECTIVE UTIL. RANGE) define ranges of weight values related to priority 472 and priority 477, respectively. More specifically, for example, effective utilization range 471 represents a range of values associated with priority 472. That is, for example, a virtualization analysis tool interpreting virtual migration policy 400 can assign priority 472 to a computing device that is associated with an effective utilization value that is included within effective utilization range 471. Similarly, effective utilization range 476 represents a range of weight values associated with priority 477.

In some embodiments, virtual migration policy 400 includes other parameters, values, or directives. For example, virtual migration policy 400 can include a data storage type list that identifies the types of data storage devices that should be included in determining utilization of data storage of a computing device. Alternatively, a data storage type list can identifies the types of data storage devices that should not be included in determining utilization of data storage of a computing device. As yet another alternative, virtual migration policy can include multiple data storage type lists. One data storage type list can identify the types or tiers of data storage devices (also referred to as "data storage resources") that should be included in determining utilization of a computing device, and another data storage type list can identify the types of data storage devices that should not be included in determining utilization of a computing device. This allows certain tiers of data storage devices (or data storage tiers) to be included and/or excluded from consideration during classification and/or prioritization of computing devices for virtualization. As a specific example, a data storage type list can include an identifier of internal data storage and an identifier of FC data storage. Thus, utilization values related to internal storage and FC data storage of a computing device will be considered (e.g., compared with data storage utilization ranges stored at virtual migration policy 400) by a virtualization analysis tool interpreting virtual migration policy 400 to determine a virtual migration policy for that computing device, and utilization values associated with other storage devices such as USB, external SCSI, or FireWire data storage devices will not be considered.

Referring to FIG. 3, policy generation module 310 can, for example, define a web-based interface via which users can provide utilization parameters, classification parameters, and utilization weights (or weight values) to virtualization analysis tool 300. Alternatively, for example, policy generation module 310 can define a graphical user interface ("GUI") other than a web-based interface or a command line interface via which a user can provide utilization parameters, classification parameters, and utilization weights to virtualization analysis tool 300. As another alternative, policy generation module 310 can interpret a file including utilization parameters, classification parameters, and utilization weights (such as an Extensible Markup Language ("XML") document) provided by a user to access utilization parameters. Policy generation module 310 can then define virtual migration policies using those utilization parameters, classification parameters, and utilization weights.

The virtual migration policies defined or generated at policy generation module 310 are stored at policy data store 330. Policy data store 330 is a hard disk drive, an optical drive, a database, or another data storage service that stores virtual migration policies. As a specific example, policy data store 330 can be a cloud-computing based data storage service. As another example, policy data store 330 can be a database such as a relational database hosted at a computing device within a data center.

Utilization value collection module 320 is a hardware module, a software module stored at a memory and hosted at a processor, and/or a combination of a hardware module and a software module that collects or accesses utilization values. Virtualization analysis tool 300 can access utilization values related to utilization values of resources at computing devices at a data store such as a database or other data storage service. Thus, utilization value collection module 320 can be a software module such as a protocol stack that implements a protocol for interfacing (e.g., communicating) with a data storage service and/or a database and is hosted (i.e., stored at a memory and executed at a processor) at virtualization analysis tool 300. Alternatively, virtualization analysis tool 300 can access utilization values at computing devices and utilization value collection module 320 can be a software module that communicates with operating systems or agents at those computing devices and is hosted at virtualization analysis tool 300.

Additionally, utilization value collection module 320 can receive values related to the resources of computing devices. For example, utilization value collection module 320 can receive values representing an amount of memory, a number of processors, a clock speed of one or more processors, types, classes, or tiers of data storage (or data storage tiers), and/or an amount of data storage at a computing device. Utilization value collection module 320 can also receive information related to devices operatively coupled to a computing device. For example, utilization value collection module 320 can receive identifiers of devices operatively coupled to a Universal Serial Bus ("USB"), a Fiber Channel ("FC") interface, and/or a Small Computer System Interface ("SCSI") of a computing device. Furthermore, utilization value collection module 320 can receive information (e.g., name, vendor, version, and patch level) related to an operating system and/or software modules hosted at a computing device.

Utilization value collection module 320 provides this information to migration analysis module 340, and migration analysis module 340 accesses a virtual migration policy (or virtual migration policies) to identify which computing devices (for which utilization values were received via utilization value collection module 320) are candidates for virtualization. For example, migration analysis module 340 compares utilization values with ranges of utilization values defined within a virtual migration policy to determine what utilization weight values to apply to a computing device. Migration analysis module 340 can then compare the utilization weight values applied to a computing device with ranges of utilization weight values to determine which virtual migration priority should be assigned to that computing device. Identification of computing devices that are candidates for virtualization is discussed in greater detail, for example, in connection with FIGS. 5, 6, and 7.

Compliance data store 350 is a hard disk drive, an optical drive, a database, or another data storage service that stores information related to capabilities and/or characteristics of physical servers and virtualized environments. As a specific example, compliance data store 350 can be a cloud-computing based data storage service. As another example, compliance data store 350 can be a database such as a relational database hosted at a computing device within a data center that stores information related to service level agreements ("SLAs") that specify capabilities and/or characteristics of physical computing devices and/or virtualized environments.

More specifically, compliance data store 350 can store information about physical computing devices and virtualized environments that limit or affect which physical computing devices can be virtualized. For example, an SLA can specify that a virtualized environment have a multipath input/output ("MPIO") level or class less than 16 paths and another (or the same) SLA can specify that a particular physical computing device (or physical environment) have a MPIO level or class that is greater than 32 paths. Migration analysis module 340 can access compliance data store before assigning priorities to physical computing devices and assign a lowest (or least significant) virtual migration priority to the physical computing devices for which one or more SLAs prevent virtualization to indicate that those physical computing devices should not be virtualized. That is, for example, migration analysis module 340 can assign a low virtual migration priority to a physical computing device to which an SLA specifying an MPIO level of at least 32 paths applies if an SLA for a virtualized environment to which the physical computing device can be migrated specifies an MPIO level of no more than 16 paths without regard to utilization weight values and/or classification weight values of the physical computing device. In other words, migration analysis module 340 can assign a low virtual migration priority to the physical computing device regardless of the utilization of the physical computing device because the SLA for the physical computing device and the SLA for the virtualized environment cannot each be satisfied.

As another example, SLAs for physical computing devices and virtualized environments can specify environment states such as a system patch level, a security patch level, a service pack level, or some other environment state. If the environment states for a physical computing device and a virtualized environment to which the physical computing device could otherwise be migrated cannot each be satisfied, the physical computing device can be assigned a virtual migration priority that prevents virtualization of that physical computing device. Moreover, SLAs can include other limitations, requirements, and/or restrictions such as business specific requirements for physical computing devices and virtualized environments and a migration analysis module can prevent (e.g., by assigning a low virtual migration priority) virtualization of a physical computing device if SLAs for that physical computing device and a target virtualization environment (e.g., a virtual machine to which that physical computing device could otherwise be migrated) cannot each be satisfied after the migration.

In some embodiments, virtualization analysis tool 300 includes additional modules such as a notification module to send the virtual migration priorities for computing devices to a user of virtualization analysis tool 300. More specifically, virtualization analysis tool 300 can include a web service module that displays a web page including the virtual migration priorities and identifiers of the computing devices to the user. Moreover, the notification module of virtualization analysis tool 300 can generate a recommendation that the computing devices with the highest virtual migration priorities be virtualized (i.e., migrated to virtual machines) if those virtual migration priorities are at or above a particular level or value. For example, a virtual migration policy can include a recommendation priority and computing devices that are assigned virtual migration policies at or above the recommendation priority can be recommended for virtualization.

Figure 5:
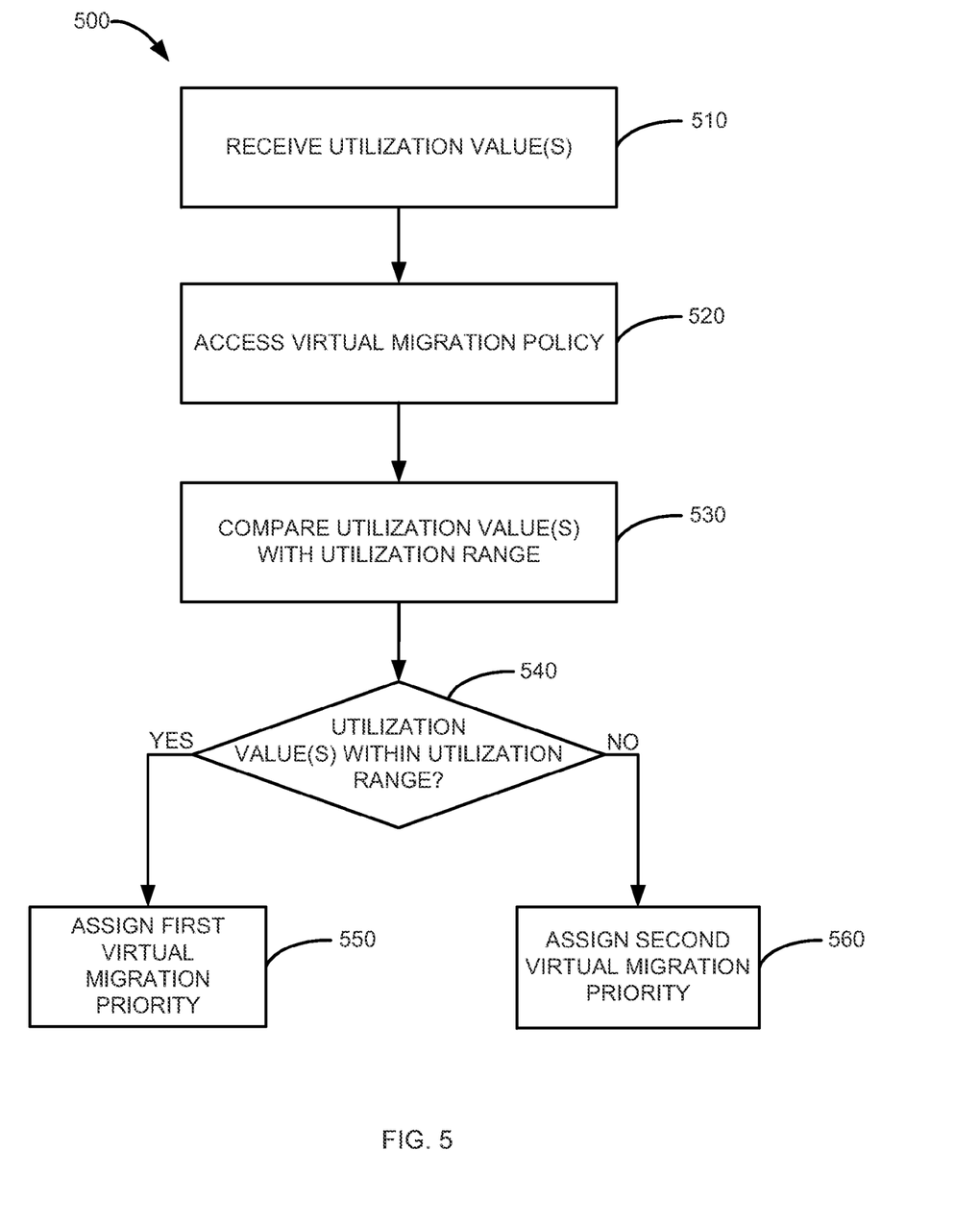
FIG. 5 is a flowchart of a process to prioritize a computing device for virtual migration, according to an embodiment.

FIG. 5 is a flowchart of a process to prioritize a computing device for virtual migration, according to an embodiment. Process 500 can be implemented as a hardware module, as a software module, and/or as a combination of a hardware module and a software module. For example, process 500 can be implemented as application-specific circuitry or as a software module including instructions stored at a memory and executed at a processor in communication with the memory. More specifically, for example, process 500 can be implemented within a data center at a virtualization analysis tool.

One or more utilization values are received at block 510. For example, utilization values can be accessed at a database or data storage service. Typically, an identifier of a computing device is included with utilization values for that computing device to identify the computing device to which the utilization values are related. Alternatively, utilization values can be accessed directly at computing devices (or at an operating system or agent of a computing device).

Utilization values can be associated with one or more time periods. That is, the utilization values can provide multiple resolutions of visibility to the utilization of resources at a computing device. For example, a utilization value can represent an hourly average resource utilization, a daily average resource utilization, a weekly average resource utilization, or a monthly average resource utilization. Thus, the utilization values can include historic information about utilization of a resource in various resolutions of time. In some embodiments, such averages can be weighted to recent resource utilization or past resource utilization.

The multiple resolutions of visibility allow the virtualization analysis tool to accurately assess utilization of a computing device to determine whether that computing device is a candidate for virtualization. As a specific example, a resource of a computing device can have high utilization during two days of each week and relatively low utilization during the remaining days of each week. Thus, a weekly average utilization value would have a relatively small magnitude. However, a daily average utilization value for each or either of the two days when the computing device has a high utilization would have a relatively large magnitude. In other words, if only a weekly resolution of resource utilization is considered, the high resource utilization during two days of the week is lost or masked by the low resource utilization during the other days of the week. Similarly, a daily average can mask hours of high resource utilization and a monthly average can mask days or weeks of high resource utilization. Thus, by utilizing multiple resolutions of resource utilizations (e.g., utilization values that represent utilization of computing device resource over various time periods), the virtualization analysis tool identifies periods during which a computing device is over- or under-utilized and more accurately determine which computing devices are candidates for virtualization.

Moreover, utilization values can be related to different resources at computing devices. For example, utilization values can be related to (or represent utilization of) a memory resource, a data storage resource, and/or a processor resource. More specifically, for a computing device, a utilization value for a memory resource, a utilization value for a data storage resource, and a utilization value for a processor resource can be received at block 510.

A virtual migration policy is accessed at block 520 to determine which virtual migration priority should be assigned to a computing device. In other words, a virtual migration policy is retrieved to access the parameters used by a virtualization analysis tool to assign priorities to computing devices based on utilization values received at block 510.

As a specific example, the virtual migration policy can include a range of utilization values and two (i.e., a first and a second) virtual migration priorities. The utilization values received at block 510 are compared with that range of utilization values at block 540. If the utilization values received at block 510 are included within the range of utilization values from the virtual migration policy, the first virtual migration priority is assigned to the computing device to which those utilization values are related at block 550. For example, a value representing the first virtual migration priority can be stored at a column of a table in a row associated with a computing device. More specifically, for example, the value representing the first virtual migration priority can be stored at a database in a table for which an identifier of the computing device is a key. If the utilization values received at block 510 are not included within the range of utilization values from the virtual migration policy, the second virtual migration priority is assigned to the computing device to which those utilization values are related at block 560. For example, a value representing the second virtual migration priority can be stored at a column of a table in a row associated with a computing device. More specifically, for example, the value representing the second virtual migration priority can be stored at a database in a table for which an identifier of the computing device is a key.

In some embodiments, the virtual migration policy can include separate ranges for different resource classes. For example, a memory utilization value can be compared with a range of utilization values related to a memory resource class, a data storage utilization value can be compared with a range of utilization values related to a data storage resource class, and a processor utilization value can be compared with a range of utilization values related to a processor resource class. Thus, the ranges of utilization values by which a computing device is prioritized for virtualization can be specific to different resource classes.

Process 500 can include blocks in addition to those illustrated in FIG. 5. Additionally, one or more blocks can be rearranged. For example, blocks 530 and 540 can be repeated for multiple computing devices for which utilization values were received at block 510. Furthermore, although process 500 is discussed above with reference to an example environment within a data center, process 500 is applicable within other environments.

Figure 6:
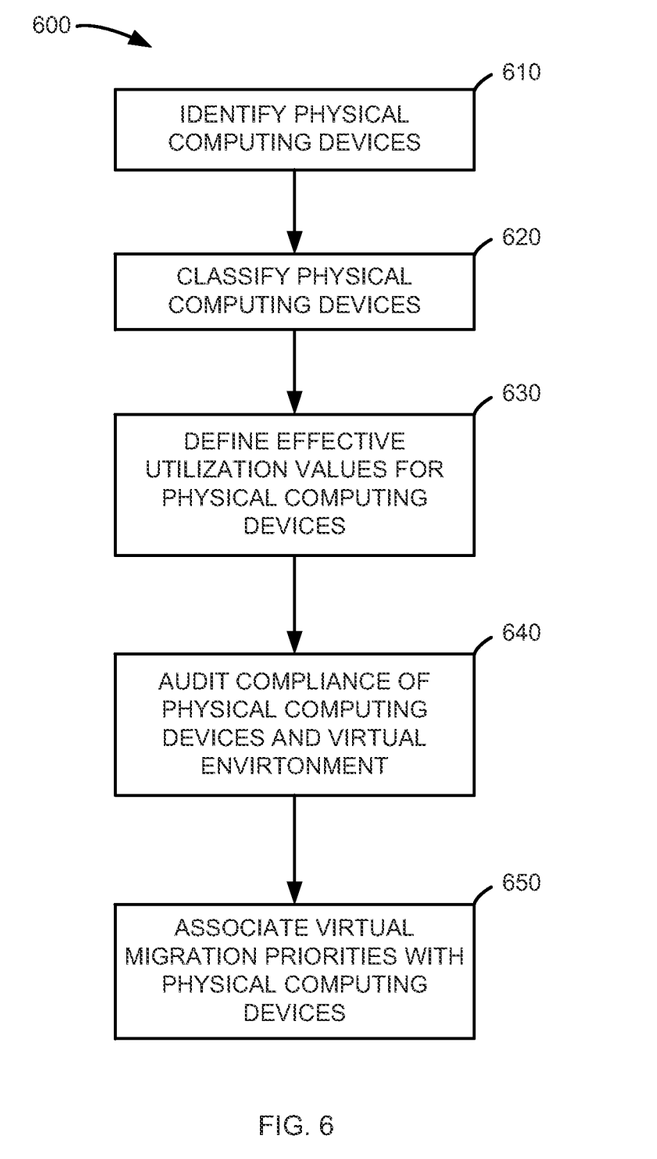
FIG. 6 is a flowchart of a process to prioritize a computing device for virtual migration, according to another embodiment.

FIG. 6 is a flowchart of a process to prioritize a computing device for virtual migration, according to another embodiment. Process 600 can be implemented as a hardware module, as a software module, and/or as a combination of a hardware module and a software module. For example, process 600 can be implemented as application-specific circuitry or as a software module including instructions stored at a memory and executed at a processor in communication with the memory. More specifically, for example, process 600 can be implemented within a data center at a virtualization analysis tool.

A data center environment can include both physical computing devices (e.g., computer servers) and virtual computing devices (e.g., virtual machines). Physical computing devices are identified at block 610. For example, a virtualization analysis tool can query (e.g., via a communications link within a data center) the computing devices within a data center to discover an operating system (e.g., name, vendor, version, etc.) or other information related to or characteristics of the configuration of each computing device (or a group of computing devices) within the data center. If the information received from a computing device is associated with a hypervisor or virtualized environment, the virtualization analysis tool can identify that computing device as a virtual computing device. As specific examples, VMware ESX™, logical partitions ("LPARs"), and virtual partitions ("VPARs") indicate that a computing device is a virtual computing device. Because virtual computing devices are virtualized, the virtualization analysis tool can discard or ignore virtual computing devices during a process to identify and/or prioritize computing devices for virtualization. If, however, the information received from a computing device is not associated with a hypervisor or virtualized environment, the virtualization analysis tool can identify that computing device as a physical computing device. As specific examples, Microsoft Windows™, Linux™, and Unix™ operating systems indicate that a computing device is a physical computing device. Physical computing devices are further considered for virtualization.

After the physical computing devices are identified, the physical computing devices are classified at block 620 based on, for example, resources of the physical computing devices. Parameters related to classification of physical computing devices can be defined within, for example, a virtual migration policy accessible to the virtualization analysis tool. The physical computing devices identified at block 610 can be queried for values related to resources of the physical computing devices. For example, the virtualization analysis tool can request from each physical computing device a values related to (or representing) an amount of memory, a number of processors, and a clock speed of each processor at that physical computing device. These values can be compared with related ranges of values associated with computing device classifications (e.g., high, medium, and low) and a classification value associated with the range of values in which these values are included can be assigned or applied to each physical computing device. For example, the physical computing devices that have relatively large amounts of memory and fast (i.e., high clock speed) processors can be classified as high (i.e., assigned a high classification value), and the physical computing devices that have relatively small amounts of memory and/or slow (i.e., high clock speed) processors can be classified as low (i.e., assigned a low classification value).

Moreover, the amounts and/or types of data storage at the physical computing devices can also be used to determine a classification value of a physical computing device. That is, a value representing an amount of data storage (e.g., the total amount of data storage of all data storage resources) at or available to a physical computing device can be compared with related ranges of values associated with computing device classifications (e.g., high, medium, and low) based on data storage and a classification value associated with the range of values in which this value is included can be assigned or applied to the physical computing device. In some embodiments, a virtual migration policy for a physical computing device can include a data storage type list that identifies tiers of data storage resources (or data storage tiers) that are used (or considered) to determine a classification value for a physical computing device. Thus, for example, only the amounts of data storage at data storage resources for which a related identifier is included in the data storage type list are used to define the value compared with related ranges of values associated with computing device classifications discussed above. Alternatively, for example, the amounts of data storage at data storage resources for which a related identifier is included in the data storage type list can be excluded from the value compared with related ranges of values associated with computing device classifications discussed above. That is, the data storage type list can include identifies types (or tiers) of data storage resources that are not used to determine (or are excluded from a determining) a classification value for a physical computing device.

In some embodiments, a virtual migration policy also includes weight values related to the classifications. For example, a different weight values can be associated with each of a high, medium, and low computing device classifications. These weight values can be combined with other weight values such as utilization weight values at block 630 to define an effective utilization value for each physical computing device.

More specifically, for each physical computing device, a group of utilization values including a memory utilization value, a data storage utilization value, and a processor utilization value can be accessed, for example at a utilization value database of a system monitoring tool including the virtualization analysis tool. The memory utilization value, the data storage utilization value, and the processor utilization value can each be compared with a range of utilization values defined within the virtual migration policy. For each of the utilization values, a flag related to the resource with which that utilization value is associated (i.e., a memory resource, processor resource, or data storage resource) is set to one value if the utilization value is not included within the related range of utilization values of the virtual migration policy and to a different value if the utilization value is included within the related range of utilization values of the virtual migration policy. For example, the flag can be a boolean flag with a true value if the utilization value is not included within the related range of utilization values of the virtual migration policy and to a false value if the utilization value is included within the related range of utilization values of the virtual migration policy.

The virtual migration policy can also include utilization weight values for each resource or resource class. For example, the virtual migration policy can include a utilization weight value for a memory resource, a utilization weight value for a data storage resource, and a utilization weight value for a processor resource. The effective utilization value can be defined at block 630 by aggregating or summing the classification weight value (i.e., the weight value related to the classification) and each of the utilization weight values for which the flag related to the resource associated with that utilization weight value has a particular value.

For example, the utilization weight values for which the flag related to the resource associated with that utilization weight value has a true value (indicating that the utilization value for that resource is not included within the related range of utilization values in the virtual migration policy) can be added to the classification weight value to define the effective utilization value for a physical computing device. In other words, the utilization weight values function as proxies for or represent utilization values. A utilization value is a value that represents the utilization or use of a resource. For example, a utilization value can be a percentage of a resource that is occupied or used, or a percentage of a resource that is not occupied or used. A utilization weight value is a value that represents, for example, a significance of a utilization value or a range of utilization values to whether a physical computing device should be virtualized. A utilization weight value can be, for example, a value between 0.0 and 1.0 that represents a significance of one or more associated utilization values with respect to virtualization of a physical computing device. For example, a utilization weight value of 0.1 can indicate a weak significance (i.e., that related utilization values do not suggest that the physical computing device should be virtualized) and a utilization weight value of 0.9 can indicate a strong significance (i.e., that related utilization values suggest that the physical computing device should be virtualized).

In some embodiments, multiple utilization values for each resource of each physical computing device can be used to define the effective utilization value for that physical computing device. For example, utilization values associated with various time periods can be used to define the effective utilization value for a physical computing device. In such embodiments, a flag value can have different values to indicate that each utilization value is included within a range of utilization values (i.e., a range of utilization values for a particular resource that is defined within a virtual migration policy), that each utilization value is not included within that range of utilization values, or that one or more of the utilization values are included within that range of utilization values and some of the utilization values are not included within that range of utilization values. Furthermore, different utilization weight values for a resource can be combined with utilization weight values for other resources and a classification weight value depending on the value of the flag to define the effective utilization value for a physical computing device. In other words, a flag related to a resource can have different values depending on the relationship of utilization values for that resource to a range of utilization values, and the value of the flag can determine which utilization weight value (e.g., from multiple utilization weight values defined and related to that resource within a virtual migration policy) for that resource is used to define an effective utilization value.

Process 600 continues to block 640 at which the physical computing devices and one or more virtualization environments are audited based on compliance information such as SLAs to determine whether each physical computing device can be virtualized. In other words, compliance information for the physical computing devices and one or more virtualization environments are compared to determine whether limitations and/or requirements of the physical computing devices and one or more virtualization environments can be satisfied (e.g., met) if each physical computing device is virtualized to one or more of the one or more virtualization environments. For example, if an SLA for a physical computing device defines a requirement for a resource to have a minimum value and an SLA for a virtualization environment defines a requirement for that resource to have a maximum value that is less than the minimum value of the SLA for the physical computing device, the virtualization environment cannot satisfy the SLA for the physical computing device without violating the SLA for the virtualization environment. Thus, the physical computing device cannot be migrated to that virtualization environment.

The effective utilization value defined at block 630 for each physical computing device is then used to determine a virtual migration priority for that physical computing device at block 650. For example, the effective utilization value itself can be the virtual migration priority for that physical computing device. Alternatively, the effective utilization value can be normalized (e.g., such that the maximum possible effective utilization value based on utilization weight values defined in a virtual migration policy has a value of 1.0), and the normalized effective utilization value can be the virtual migration priority for that physical computing device. As yet another alternative, a virtual migration policy can include ranges of effective utilization values and a virtual migration priority for each of the ranges of effective utilization values. Thus, the virtual migration priority for the range of effective utilization values in which the effective utilization value for a physical computing device is included can be associated with the physical computing device as the virtual migration priority for the physical computing device.

As discussed above, a system administrator (e.g., a data center administrator) can define the various parameters (e.g., classifications, classification weight values, utilization weight values and associated ranges of utilization values, and/or virtual migration priorities and associated ranges of effective utilization values) to tune or customize the prioritization of physical computing devices. That is, the system administrator can provide input to a virtualization analysis tool to define thresholds of parameters based on which the virtualization analysis tool assigns virtual migration priorities to physical computing devices. If SLAs or other limitations or requirements audited at block 640 prevent virtualization of a physical computing device, that physical computing device can be assigned a low (or insignificant) virtual migration policy to that physical computing device to prevent virtualization of that physical computing device.

Process 600 can include blocks in addition to those illustrated in FIG. 6. Additionally, one or more blocks can be rearranged. For example, blocks 630 and 650 can be repeated for multiple virtual migration policies. That is, a physical computing device can receive (or be assigned) multiple virtual migration priorities, where each virtual migration priority is based on the parameters of a different virtual migration policy. Thus, the virtualization analysis tool can determine virtual migration priorities based on policies that are weighted or focused on, for example, the utilization of different resources. For example, one virtual migration policy can have utilization weight values that are more significant for data storage resources than for processor resources and/or memory resources (i.e., the virtual migration policy is weighted to data storage resources), and another virtual migration policy can have utilization weight values that are more significant for processor resources than for data storage resources and/or memory resources (i.e., the virtual migration policy is weighted to processor resources). Furthermore, although process 600 is discussed above with reference to an example environment within a data center, process 600 is applicable within other environments.

Figure 7:
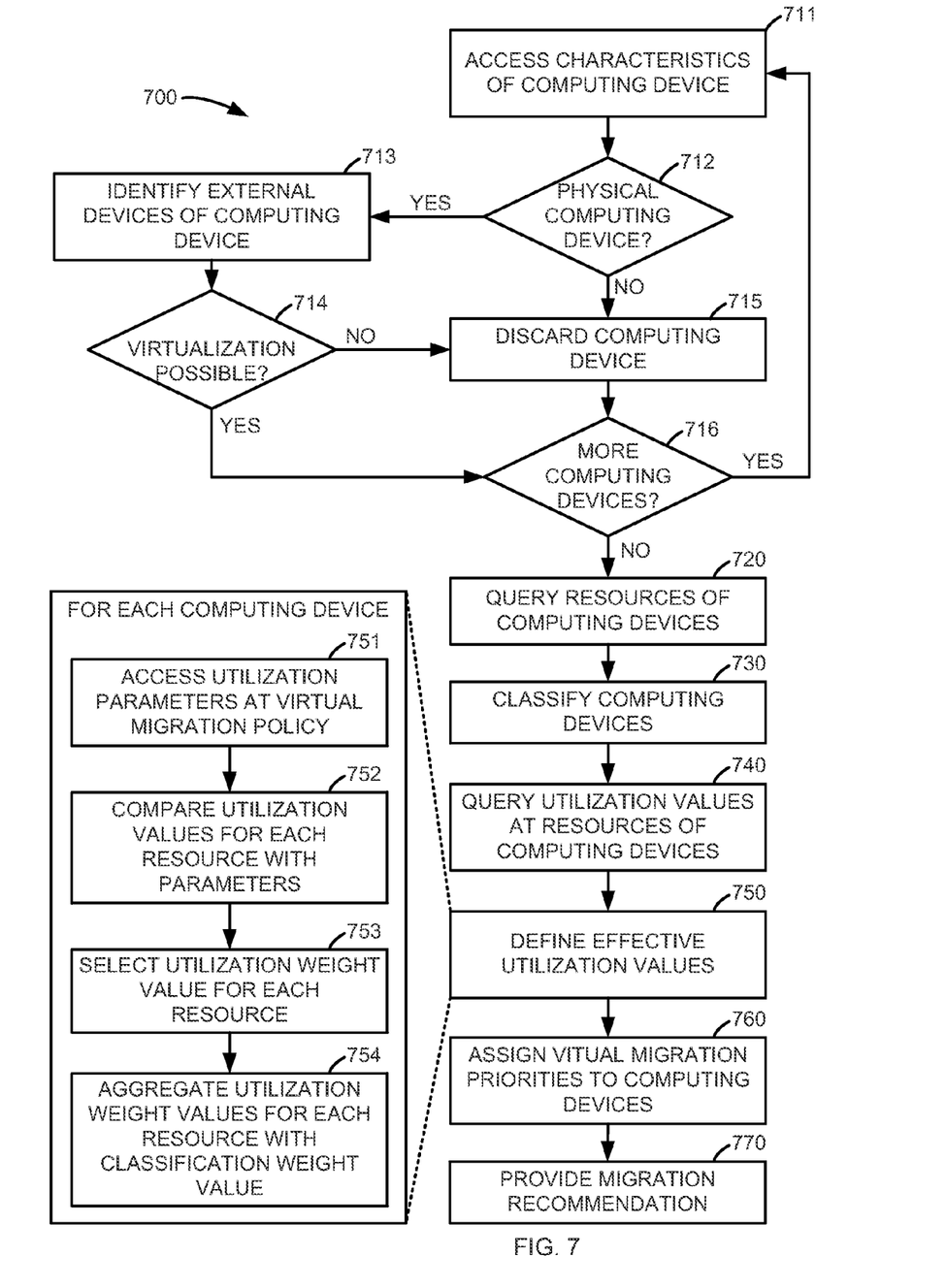
FIG. 7 is a flowchart of a process to recommend a computing device for virtual migration, according to another embodiment.

FIG. 7 is a flowchart of a process to recommend a computing device for virtual migration, according to another embodiment. Process 700 can be implemented as a hardware module, as a software module, and/or as a combination of a hardware module and a software module. For example, process 700 can be implemented as application-specific circuitry or as a software module including instructions stored at a memory and executed at a processor in communication with the memory. More specifically, for example, process 700 can be implemented within a data center at a virtualization analysis tool.

Characteristics of a computing device are accessed at block 711. For example, an operating system or other characteristics of the computing device that indicates whether the computing device is a physical computing device is accessed at block 711. If the computing device is determined to be a physical computing device at block 712, external devices that are operatively coupled to the computing device are identified at block 713. For example, a virtualization analysis tool can query an operating system or agent at a computing device to request identifiers of external devices such as USB, FC, SCSI, or other external devices of the computing device. At block 714, process 700 determines whether the external devices can be emulated or made available within a virtualized environment. If the external devices can be virtualized, process 700 proceeds to block 716. If the external devices cannot be virtualized, that computing device is discarded (or ignored) at block 715.

Additionally, at block 714 process 700 (or a virtualization analysis tool implementing process 700) can audit the physical computing device and one or more virtualization environments based on compliance information such as SLAs to determine whether the physical computing device can be virtualized. In other words, compliance information for the physical computing device and one or more virtualization environments are compared to determine whether limitations and/or requirements of the physical computing devices and one or more virtualization environments can be satisfied if the physical computing device is virtualized to one or more of the one or more virtualization environments. If the compliance information (e.g., limitations and/or requirements) that applies to the physical computing device and the compliance information (e.g., limitations and/or requirements) that applies to one or more virtualization environments can be satisfied if the physical computing device is virtualized, process 700 proceeds to block 716. If the compliance information that applies to the physical computing device and the compliance information that applies to one or more virtualization environments cannot be satisfied if the physical computing device is virtualized, process 700 proceeds to block 715.

Similarly, if the computing device is determined to not be a physical computing device at block 712, that computing device is discarded (or ignored) at block 715. After the computing device is discarded or the external devices of the computing device are identified, if there are more computing devices to be considered at block 716, process 700 proceeds to block 711 to determine whether that computing device is a physical computing device.

If there are no more computing devices to be considered at block 716, the resources of the computing devices are queried at block 720. Values related to the capabilities of the resources of each computing device identified above (i.e., the physical computing devices) are received in response to the queries and are used to classify each computing device at block 730. In some embodiments, classification weight values defined at a virtual migration policy for various computing device classifications can also be assigned to computing devices at block 730.

After the computing devices are classified, utilization values of the resources of the computing devices are queried at block 740. As discussed above, multiple utilization values related to each resource of each computing device can be queried at block 740. For example, a monthly average utilization value and a weekly average utilization value for each of a memory resource, a processor resource, and a data storage resource at each computing device can be queried by and received at a virtualization analysis tool.

The utilization values queried at block 740 are used to define effective utilization values at block 750. More specifically, for each computing device, utilization parameters related to resources for which utilization values were queried at block 740 are accessed at a virtual migration policy at block 751. The utilization values for each resource of that computing device are compared with related parameters (e.g., ranges of utilization values) at block 752 and utilization weight values are selected for each resource based on those comparisons at block 753. For example, one utilization weight value is selected if a monthly average utilization value and a weekly utilization weight value are within a range of utilization values, and a different utilization weight value is selected if only one or neither of the monthly average utilization value and the weekly utilization value is within the range of utilization values.

In some embodiments, the utilization values for some resources are not compared with related parameters at block 752. For example, a data storage type list included within a virtual migration policy can define which utilization values for data storage resources are considered or compared with ranges of related values at block 752. In other words, utilization values for data storage resources of a computing device are compared with related ranges of values at block 752 only if identifiers of those data storage resources are included in the data storage type list. Alternatively, utilization values for data storage resources for which a related identifier is not included in the data storage type list can be ignored, discarded, and/or not requested at block 740.

Because the data storage type list defines which data storage resources will be considered by process 700, the data storage type list can be used to define which tiers of data storage resources (or data storage tiers) have an impact on (i.e., affect) the virtual migration priority of physical computing devices and which tiers of data storage resources do not have an impact on the virtual migration priority of physical computing devices. In other words, the data storage type list can define which data storage tiers are associated with prioritization of computing devices for virtualization and which data storage tiers are not associated with prioritization of computing devices for virtualization. As an alternative, the data storage type list can define which data storage resources will not be considered by process 700. That is, data storage resources for which an identifier is included in the data storage type list can be ignored or not considered by process 700.

The utilization weight values for each resource and the classification weight value for that computing device are aggregated to define the effective utilization value for that computing device at block 754. Blocks 751-754 are then repeated for each computing device that was not discarded at block 715.

Virtual migration priorities are then assigned to the computing devices based on the effective utilization values of those computing devices at block 760. For example, as discussed above, virtual migration policies can be assigned to the computing devices based on ranges of effective utilization values defined in a virtual migration policy. Alternatively, for example, the effective utilization value of each computing device can be normalized and the normalized effective utilization value for each computing device can be the virtual migration priority of that computing device, where the highest (or lowest depending on the normalization scheme) normalized effective utilization value is the most significant virtual migration priority (i.e., the computing device assigned that virtual migration priority can benefit most from virtualization).

A recommendation of which computing devices should be virtualized is then provided to a user at block 770. For example, a list of the computing devices including the virtual migration priority of each computing device can be send to the user in a notification such as an electronic mail message. As another example, a list of the computing devices ordered within the list by the virtual migration priority of each computing device can be send to the user in a notification such as an electronic mail message. Alternatively, for example, identifiers of the computing devices and the virtual migration priority of each computing device can be displayed to the user at a graphical user interface ("GUI") such as a view of a software application or within a web browser. Moreover, the virtualization analysis tool can highlight or otherwise set off a group of the computing devices with the most significant virtual migration priorities.

Process 700 can include blocks in addition to those illustrated in FIG. 7. Additionally, one or more blocks can be rearranged. For example, some utilization values related to resources of a computing device can be discarded. As a more specific example, a virtual migration policy can include a data storage type list that identifies tiers of data storage that are not considered in determining whether computing devices should be virtualized. For example, a data storage type list can include a value that identifies a spindle speed of a hard disk drive, and utilization values associated with hard disk drives that have a spindle speed lower than the spindle speed in the data storage type list can be discarded or ignored. This allows a virtualization analysis tool to ignore utilization values of resources that are not relevant to determining virtual migration priorities. Moreover, a virtualization analysis tool can not access or collect utilization values for resources such as data storage resources of types, classes, or tiers that are included (or alternatively are not included) within type, class, or tier lists of a virtual migration policy. Furthermore, although process 700 is discussed above with reference to an example environment within a data center, process 700 is applicable within other environments.

Some embodiments include a processor and a related processor-readable medium having instructions or computer code thereon for performing various processor-implemented operations. Such a processor can be a general-purpose processor or an application-specific process and can be implemented as a hardware module and/or a software module. A hardware module can be, for example, a microprocessor, a microcontroller, an application-specific integrated circuit ("ASIC"), a programmable logic device ("PLD") such as a field programmable gate array ("FPGA"), and/or other electronic circuits that perform operations. A software module can be, for example, instructions, commands, and/or codes stored at a memory and executed at another processor. Such a software module can be defined using one or more programming languages such as Java™, C++, C, an assembly language, a hardware description language, and/or another suitable programming language. For example, a processor can be a virtual machine hosted at a computer server including a microprocessor and a memory.

In some embodiments, a processor can include multiple processors. For example, a processor can be a microprocessor including multiple processing engines (e.g., computation, algorithmic or thread cores). As another example, a processor can be a computing device including multiple processors with a shared clock, memory bus, input/output bus, and/or other shared resources. Furthermore, a processor can be a distributed processor. For example, a processor can include multiple computing devices, each including a processor, in communication one with another via a communications link such as a computer network.

Examples of processor-readable media include, but are not limited to: magnetic storage media such as a hard disk, a floppy disk, and/or magnetic tape; optical storage media such as a compact disc ("CD"), a digital video disc ("DVDs"), a compact disc read-only memory ("CD-ROM"), and/or a holographic device; magneto-optical storage media; non-volatile memory such as read-only memory ("ROM"), programmable read-only memory ("PROM"), erasable programmable read-only memory ("EPROM"), electronically erasable read-only memory ("EEPROM"), and/or FLASH memory; and random-access memory ("RAM"). Examples of computer code include, but are not limited to, micro-code or micro-instructions, machine instructions, such as produced by a compiler, and files containing higher-level instructions that are executed by a computer using an interpreter. For example, an embodiment may be implemented using Java™, C++, or other object-oriented programming language and development tools. Additional examples of computer code include, but are not limited to, control signals, encrypted code, and compressed code.

Figure 8:
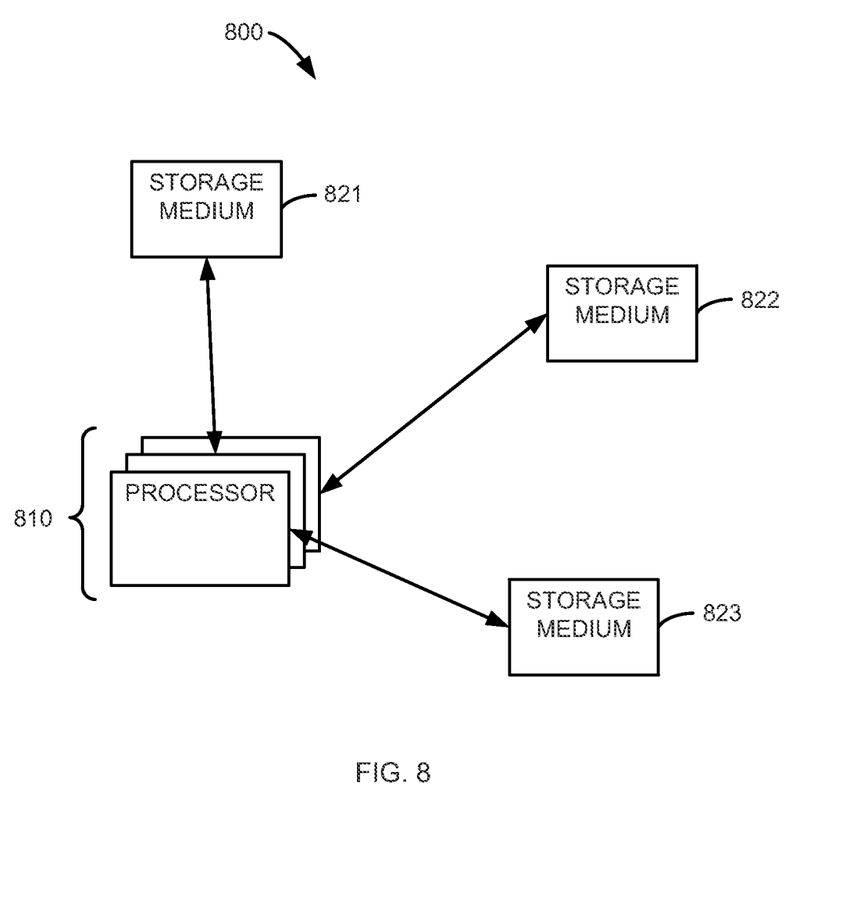
FIG. 8 is a schematic block diagram of a system including a processor and storage media, according to an embodiment.

As an example of a system including one or more processors and processor-readable storage media, FIG. 8 is a schematic block diagram of system 800 including a processor and storage media, according to an embodiment. As illustrated in FIG. 8, system 800 includes one or more processors 810 operatively coupled to storage medium 821, storage medium 822, and storage medium 823. One or more processors 810 can access instructions or code at storage medium 821, storage medium 822, and storage medium 823. Storage media 821, 822, and 823 can be any processor-readable media and/or related devices to access processor-readable media. For example, storage medium 821 can be a hard disk drive including a magnetic storage medium, storage medium 822 can be an optical drive such as a DVD drive and can accept DVD storage media on which processor-readable instructions can be stored, and storage medium 823 can be a FLASH memory drive with a Universal Serial Bus ("USB") interface. In some embodiments, storage media 821, 822, and/or 823 can be local to (e.g., coupled to a common computing device) one or more processors 810. In some embodiments, storage media 821, 822, and/or 823 can be remote from (e.g., coupled to a separate computing device) one or more processors 810 and in communication with one or more processors 810 via communications link. Furthermore, one or more of storage media 821, 822, and/or 823 can be local to one or more processors 810 and one or more of the remaining of storage media 821, 822, and/or 823 can be remote from one or more processors 810.

As a more specific example, one or more processors 810 can be included within a computing device having a hard disk drive represented by storage medium 821 and a DVD drive including DVD media represented by storage medium 822. The computing device can also include a USB host controller to communicate with a FLASH memory drive represented by storage medium 823. One or more processors 810 can access processor-readable instructions such as processor-readable instructions that implement an operating system, software application, and/or one or more processes at any of storage media 821, 822, and/or 823. Said differently, one or more processors 810 can interpret or execute instructions at processor-readable media via storage medium 821, storage medium 822, and/or storage medium 823. In some embodiments, system 800 can include one or more memories such as RAM that function as a cache between one or more of storage medium 821, storage medium 822, and/or storage medium 823 and one or more processors 810 for instructions or code stored (or accessible) at one or more of storage medium 821, storage medium 822, and/or storage medium 823.

While certain embodiments have been shown and described above, various changes in form and details may be made. For example, some features of embodiments that have been described in relation to one embodiment and/or process can be useful to other embodiments. In other words, processes, features, and/or properties of various embodiments (e.g., a process performed or a feature existing at) described in relation to one embodiment can be related to other embodiments. Furthermore, it should be understood that the systems and methods described herein can include various combinations and/or sub-combinations of the components and/or features of the different embodiments described. Thus, features described with reference to one or more embodiments can be combined with other embodiments described herein.

What is claimed is:

1. A non-transitory processor-readable medium storing code representing instructions to cause a processor to perform a process, the process comprising:

defining a classification weight value for each physical computing device from a plurality of physical computing devices;

selecting, for each physical computing device from the plurality of physical computing devices, a first utilization weight value in response to determining whether a first utilization value associated with a first resource of that physical computing device is included within a first range of utilization values defined by a first utilization parameter and a second utilization parameter at a virtual migration policy;

selecting, for each physical computing device from the plurality of physical computing devices, a second utilization weight value in response to determining whether a second utilization value associated with a second resource of that physical computing device is included within a second range of utilization values defined by a third utilization parameter and a fourth utilization parameter at the virtual migration policy;

defining an effective utilization value for each physical computing device from the plurality of physical computing devices based on the classification weight value, the first utilization weight value, and the second utilization weight value of that physical computing device; and associating a virtual migration priority with each physical computing device from the plurality of physical computing devices based on the effective utilization value, the virtual migration priority having a first value if the effective utilization value is within a first range of utilization values and a second value if the effective utilization value is within a second range of utilization values.

2. The processor-readable medium of claim 1, wherein the first resource of each physical computing device from the plurality of physical computing devices is a data storage resource, the process further comprising:

determining that the data storage resource of that physical computing device is associated with a data storage tier associated with prioritization of that physical computing device.

3. The processor-readable medium of claim 1, wherein the first resource of each physical computing device from the plurality of physical computing devices is a data storage resource, the process further comprising:

comparing an identifier of the data storage resource of that physical computing device with each identifier from a plurality of identifiers included within a data storage identifier list of a virtual migration policy associated with that physical computing device, the identifier of the data storage resource associated with an identifier from the plurality of identifiers included within the data storage identifier list.

4. The processor-readable medium of claim 1, wherein:
the first resource is associated with a data storage resource class; and
the second resource is associated with a processor resource class.

5. The processor-readable medium of claim 1, the process further comprising:

sending to a user a recommendation to migrate a service hosted at a physical computing device from the plurality of physical computing devices to a virtual computing device if the virtual migration priority of that physical computing device has the first value.

6. The processor-readable medium of claim 1, wherein the classification weight value of each physical computing device from the plurality of physical computing devices is selected from a plurality of classification weight values based on at least the first resource.

7. The processor-readable medium of claim 1, the process further comprising:

identifying an external resource operatively coupled to a physical computing device from the plurality of physical computing devices; and determining that the external resource can be virtualized at a virtual computing device.

8. The processor-readable medium of claim 1, wherein the effective utilization value is defined for each physical computing device from the plurality of physical computing devices based on the classification weight value, the first utilization weight value, the second utilization weight value, and a third utilization weight value of that physical computing device, the third utilization weight value associated with the first resource and a first time duration, the first utilization weight value is associated with a second time duration different from the first time duration.

9. The processor-readable medium of claim 1, wherein the classification weight value for each physical computing device from the plurality of physical computing devices is defined based on a utilization value of the first resource of that physical computing device.

10. A method to prioritize a computing device for virtualization, comprising:

assigning a classification weight value to the computing device based on a resource of the computing device;

determining whether a first utilization value of the resource is included within a range of utilization values defined by a first utilization parameter and a second utilization parameter, the first utilization parameter and the second utilization parameter included within a virtual migration policy associated with the computing device, the first utilization value is associated with a first time duration;

accessing a second utilization value associated with a computing device, the second utilization value associated with a second time duration;

determining whether the second utilization value of the resource is included within the range of utilization values;

defining an effective utilization value for the computing device based on the classification weight value, the determining whether the first utilization value of the resource is included within the range of utilization values, and the determining whether the second utilization value of the resource is included within the range of utilization values;

assigning a first virtual migration priority to the computing device if the effective utilization value is within a range of effective utilization values; and assigning a second virtual migration priority to the computing device if the effective utilization value is not within the range of effective utilization values.

11. The method of claim 10, wherein the first utilization value is associated with a data storage resource of the computing device, the method further comprising:

determining that the data storage resource is associated with a data storage tier associated with prioritization of the computing device.

12. The method of claim 10, further comprising:
identifying the computing device as a physical computing device within an environment including a plurality of physical computing devices and a plurality of virtual computing devices.

13. The method of claim 10, wherein the first utilization value is associated with a first data storage resource of the computing device and the second utilization value is associated with a second data storage resource of the computing device, the method further comprising:
determining that a data storage tier of the second data storage resource cannot be virtualized; and
discarding the second utilization value.

14. A physical to virtual analysis system, comprising:
a processor;
a policy data store to store a plurality of virtual migration policies;
a computing device interface module to access a first utilization value and a second utilization value associated with each computing device from the plurality of computing devices; and
a migration analysis module to access at the policy data store a virtual migration policy associated with each computing device from the plurality of computing devices from the plurality of virtual migration policies, to receive the first utilization value and the second utilization value associated with that computing device from the computing device interface module, to select a first utilization weight value associated with that computing device in response to determining whether the first utilization value for that computing device is included within a first range of utilization values defined by a first utilization parameter and a second utilization parameter at the virtual migration policy for that computing device, to select a second utilization weight value associated with that computing device in response to determining whether the second utilization value for that computing device is included within a second range of utilization values defined by a third utilization parameter and a fourth utilization parameter at the virtual migration policy for that computing device, and to define a classification weight value for that computing device,
the migration analysis module configured to define a virtual migration priority for each computing device from the plurality of computing devices based on the virtual migration policy associated with that computing device, the first utilization weight value and the second utilization weight value associated with that computing device, and the classification weight value for that computing device.

* * * * *